No. 666,734. Patented Jan. 29, 1901.
W. C. CAMPBELL & F. M. HUMPHREY.
FREIGHT CAR, &c.
(Application filed Nov. 7, 1899.)
(No Model.) 2 Sheets—Sheet 1.

WITNESSES:
Franck L. Ourand
S. M. Kraft

INVENTORS
W. C. Campbell
F. M. Humphrey
BY
James S. Duffie
ATTORNEY

No. 666,734. Patented Jan. 29, 1901.
W. C. CAMPBELL & F. M. HUMPHREY.
FREIGHT CAR, &c.
(Application filed Nov. 7, 1899.)
(No Model.) 2 Sheets—Sheet 2.
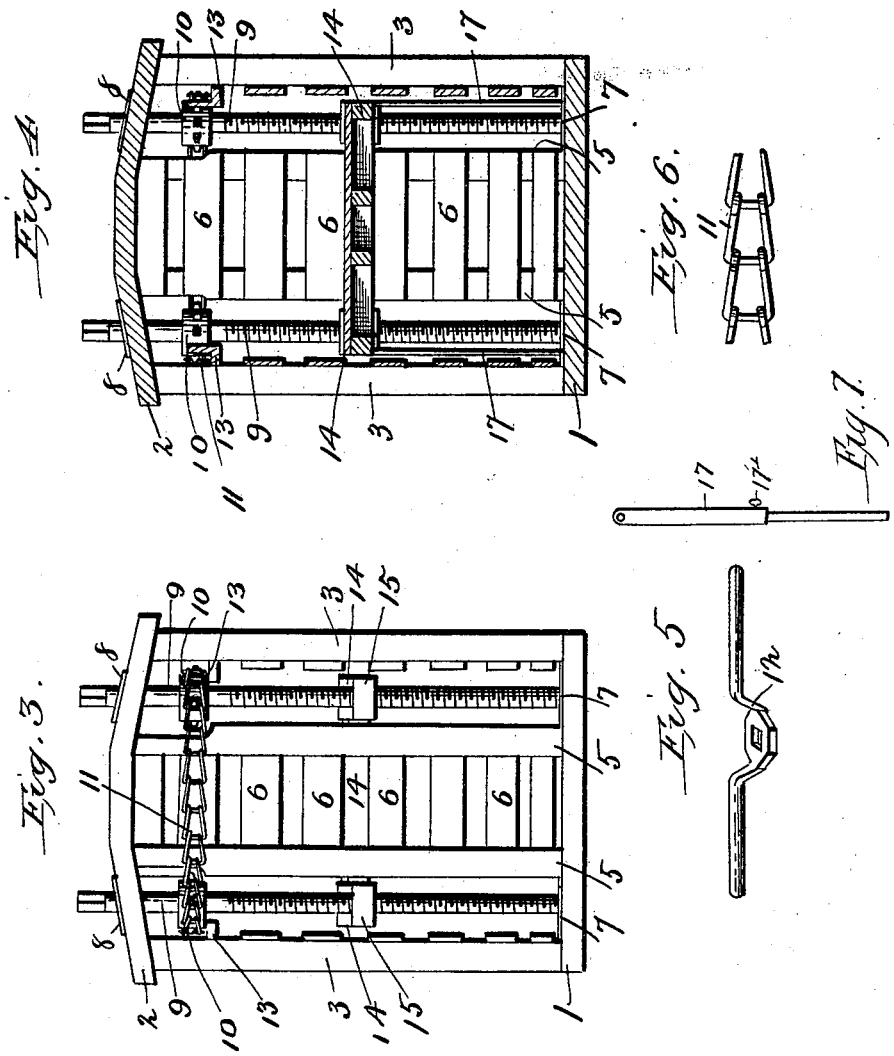

United States Patent Office.

WILLIAM C. CAMPBELL AND FRANCIS M. HUMPHREY, OF PENDLETON, OREGON.

FREIGHT-CAR, &c.

SPECIFICATION forming part of Letters Patent No. 666,734, dated January 29, 1901.

Application filed November 7, 1899. Serial No. 736,176. (No model.)

*To all whom it may concern:*

Be it known that we, WILLIAM C. CAMPBELL and FRANCIS M. HUMPHREY, citizens of the United States, residing at Pendleton, in the county of Umatilla and State of Oregon, have invented certain new and useful improvements in freight-cars, wagons, and other vehicles used for carrying freights of all kinds, consisting of adjustable deck, platform, or shelf, one or more, for shipping or transporting cattle, sheep, hogs, and other stock and for poultry, fruit, vegetables of all kinds, and any other freights, of which the following is a specification.

Figure 1:
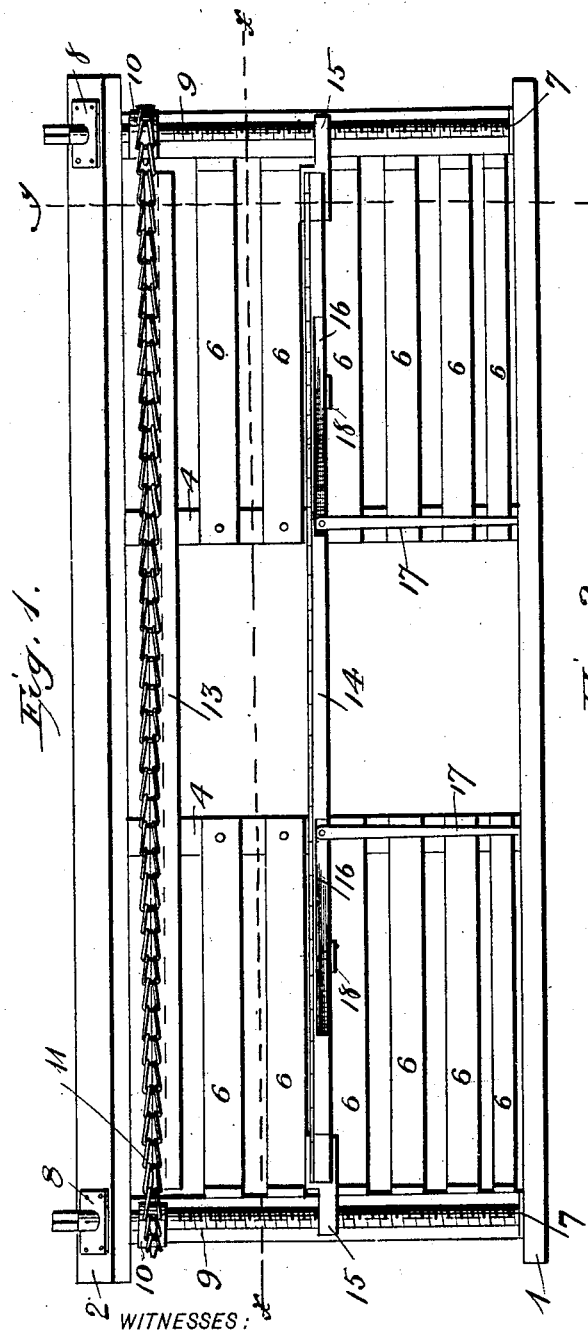
Figure 2:
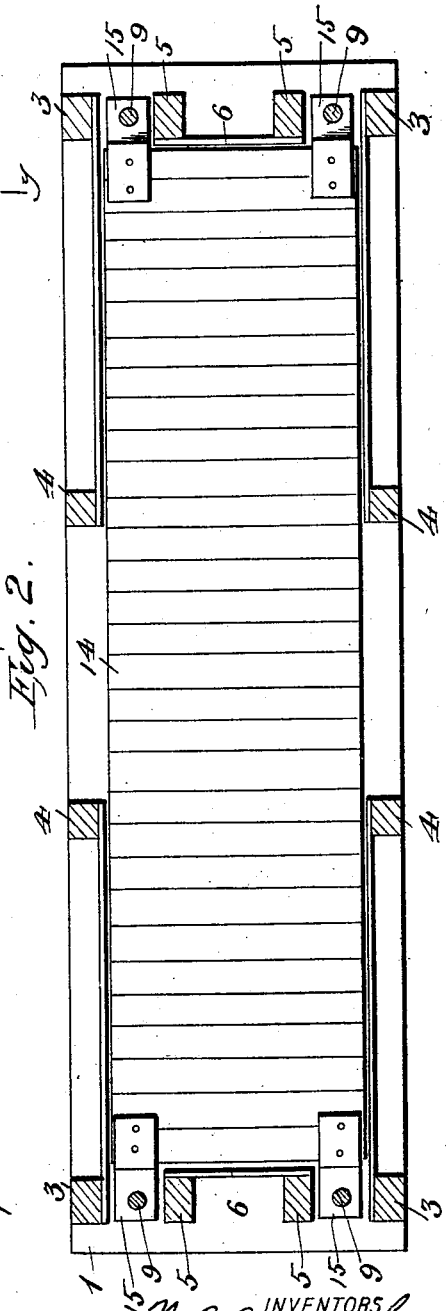

In the accompanying drawings, Figure 1 is a side elevation of our invention. Fig. 2 is a horizontal sectional view of Fig. 1, cut on the line X X. Fig. 3 is a front end view of our invention. Fig. 4 is a vertical sectional view on the line Y Y, Fig. 1, looking from the front. Fig. 5 is a perspective view of the lever. Fig. 6 is a section of the sprocket-chain. Fig. 7 is a perspective view of one of the arms 17 when made telescopic.

Our invention is described as follows:

1 is the bottom of the body of the coach.

2 is the top.

3 represents the corner posts.

4 represents the side posts. There may be any number of side posts, the number being regulated by the size of the body and the strength required.

5 represents end posts.

6 represents the weather-boarding slats.

The body may be weather-boarded or may be covered with slats, and these slats or weather-boards may run vertically or horizontally.

Near each corner of the body and on the upper face of the bottom thereof and between the corner posts 3 and the end posts 5 is situated a socket 7, adapted to carry the cylindrical ends of rods.

On the upper face of the top of the coach and near each corner and immediately on a vertical line above the lower sockets is a bearing 8.

9 represents cylindrical rods, their lower ends working in the sockets 7 and their upper ends through the bearings 8. These rods are four in number, one at each corner of the body, and they are threaded their entire length inside of the body. Just above the threading on these rods are rigidly secured, one on each rod, sprocket-wheels 10. These sprocket-wheels are all the same size and their sprockets or cogs are all the same size and all the same distance from each other. Running around the entire body and over these sprocket-wheels is an endless sprocket-chain 11, so that when either one of these rods is revolved all the other three are revolved at the same time and with the same speed and by the same chain. The upper ends of these rods 9 are made square, and adapted to fit on either one of these rods is a double-handed lever 12; but this lever may be single-handed and in any shape provided it is adapted to rotate any one of said rods.

13 represents sprocket-chain guide-tracks consisting of an L-shaped piece of wood or other material, one on each side of the coach, having their lower extensions secured to the inner faces of the side posts 4, their upper parts extending inwardly and forming thereby, between said upper parts and the said posts, tracks for the sprocket-chain to run in.

14 is an adjustable deck, platform, or shelf as long and as wide as the inner surface of the body of the coach. There may be only one of these adjustable decks, or there may be as many as needed for the purpose to which the coach may be applied. This adjustable deck or these adjustable decks may be made in any substantial manner and have extending from each corner a bearing 15, which extends between the corner and end posts. Each one of these bearings is provided with a threaded opening in which work the threaded rods 9, so that when the said rods are turned to the right the adjustable deck is caused thereby to ascend, and when the said rods are turned to the left said deck descends. In each side of the said deck are recesses 16, in which are pivoted standards 17, adapted to swing down and form feet to support the center or middle part of said deck. These standards 17 may be turned up into said recesses 16 and secured in place each by a button 18. These standards may be made adjustable as far as their lengths are concerned by making them telescopic, so that the deck may occupy any position in the coach in relation to the bottom or top thereof and the center braced by arms; but where the freight is light the arms may be dispensed with.

Having described our invention, what we claim as new, and desire to secure by Letters Patent, is—

1. The combination of a car-body, consisting of a bottom and top, corner posts, side posts, and end posts; sockets, one in each corner of the bottom, between the corner posts and end posts; bearings, one in each corner of the top, immediately over said sockets; threaded rods working in said sockets and bearings; sprocket-wheels, one rigidly secured near the upper end of each of said rods; endless sprocket-chain, working on said sprocket-wheels and adapted to rotate said rods, all at the same time and the same speed; a movable deck, filling the entire inner space of the body as to length and width; threaded bearings, one secured to each corner of the deck, and extending between the corner and end posts and working on said threaded rods, said rods adapted to be rotated by lever or otherwise and to move said deck up and down in said body, from bottom to top and from top to bottom; substantially as shown and described and for the purposes set forth.

2. The combination of a car-body, consisting of top, corner posts, side posts and end posts; sockets in each corner of the bottom and between the end and corner posts; bearings in the top immediately over said sockets; threaded rods, working in said sockets and bearings; sprocket-wheels, one rigidly secured near the upper end of each rod; endless sprocket-chain, working on said sprocket-wheels; a chain-guide secured to the posts of the body and adapted to carry said chain; a movable deck as long and as wide as the inner surface of the floor; threaded bearings, one secured to each corner of the deck extending endwise between the end and corner posts, and working on the threaded rods; said threaded rods adapted to be rotated by a lever or otherwise, and thus rotate all of the rods at the same time and at the same speed and move said movable deck up and down in said body, substantially as shown and described and for the purposes set forth.

In testimony whereof we affix our signatures in presence of two witnesses.

WILLIAM C. CAMPBELL.
FRANCIS M. HUMPHREY.

Witnesses:
EDWARD D. BOYD,
IDA BOYD.